May 29, 1962 H. R. WARREN 3,037,089

ANGLED TRANSDUCER HEADS TO MINIMIZE MAGNETIC COUPLING

Filed Nov. 1, 1956 2 Sheets-Sheet 1

INVENTOR.
HENRY RAY WARREN
BY Morris Rabkin
ATTORNEY

May 29, 1962 H. R. WARREN 3,037,089

ANGLED TRANSDUCER HEADS TO MINIMIZE MAGNETIC COUPLING

Filed Nov. 1, 1956 2 Sheets-Sheet 2

INVENTOR.
HENRY RAY WARREN

BY [signature]

ATTORNEY

United States Patent Office 3,037,089
Patented May 29, 1962

3,037,089

ANGLED TRANSDUCER HEADS TO MINIMIZE MAGNETIC COUPLING

Henry Ray Warren, Haddonfield, N.J., assignor to Radio Corporation of America, a corporation of Delaware Filed Nov. 1, 1956, Ser. No. 619,864
5 Claims. (Cl. 179—100.2)

The present invention relates to magnetic record transducers, and more particularly to an improved magnetic record transducer capable of cooperating with a plurality of closely spaced magnetic record tracks.

It has become conventional to record a plurality of magnetic record tracks on a single magnetic record member, such as may be in the form of a flexible, non-magnetic tape coated with retentive magnetic material. The recording and reproduction of music stereophonically can be conveniently accomplished by means of two record tracks recorded simultaneously on a single record member. Other uses of multiple tracks, for example in the business machine field, are known. In the interest of fullest utilization of the record medium and for reasons of convenience of operation, the record tracks are desirably small in width and spaced in close proximity to each other so that the magnetic record tape may be quite narrow. The aforementioned characteristics of magnetic record members have made it difficult to provide a magnetic record transducer that will operate to record and reproduce signals recorded on a plurality of record tracks with high fidelity.

Inherent in the use of tracks spaced in close proximity to each other is the tendency for the signals on one track to be transferred by way of the transducer into the portions of the transducer designed to cooperate with the other track or onto the other track. The result of unwanted transference of signals between the tracks is referred to in the art as "cross-talk." Full utilization of plural track magnetic recording requires the reproduction and recording of distinct record tracks either individually or simultaneously. Since different signals are recorded on each record track, it is important to prevent the transfer of signals from or to the other record tracks when an individual record track is being scanned by the magnetic record transducer.

Magnetic record transducers for multi-track operation have been constructed in the past either with the view to decreasing cross-talk among the tracks or to meet extremely limited space requirements. The present invention provides features which permit the construction of a miniature multi-track magnetic record transducer in which detrimental cross-talk is substantially negligible.

Magnetic transducers used in stereophonic sound recording and reproduction systems are constructed accurately to preserve the phase relationship between the separately recorded signals, Slight variations from proper positional relationship among the elements of the transducers detract from the desired stereophonic effect. Structural features of the transducer of the present invention preserve the proper positional relationship between the elements from the transducer and insure proper performance of stereophonic sound systems.

Magnetic record transducers which cooperate with a plurality of record tracks may include a number of core elements corresponding to the number of tracks to be recorded or reproduced. Each of the elements provides a magnetic circuit having a signal gap which is adapted to cooperate with and scan a single one of the record tracks. A signal translating coil is wound on each core element.

It has been found that cross-talk results from unwanted magnetic flux originating in one of the record tracks which is transferred to the core element of a magnetic record transducer that is cooperating with another record track. Magnetic coupling between adjacent core elements is responsible, to a large extent, for the establishment of unwanted flux in a multi-track transducer. The present invention includes features for eliminating such magnetic coupling while providing a compact magnetic transducer in which the signal gaps are in close proximity, as dictated by the close spacing of record tracks.

Briefly described, a magnetic record transducer of the present invention includes at least two core elements, each defining independent magnetic circuits providing a signal gap. A signal translating coil is wound around a portion of each core element. The portions of the core elements providing the signal gaps are disposed in close proximity to each other, as dictated by the spacing of the record tracks on the record members which will cooperate with the transducer. The portions of the core members bearing the signal translating coils are maintained at an inclination with respect to each other, thereby providing room between the core elements for the coils and an electromagnetic shield, the latter being included, if desired. Thus, the axes of the signal translating coils are at an angle with respect to each other. The portions of each core element, which are furtherest in back of the signal gaps thereof, are disposed, by virtue of the inclination of the core elements, at a given distance from each other. This distance is selected so that the reluctance of any magnetic circuit including both core elements is too high to maintain a magnetic flux of more than negligible magnitude during operation of the transducer. It follows that the magnetic coupling between the core elements is minimized.

By way of further explanation, it has been found, in accordance with the invention, that the unwanted magnetic flux which carries cross-talk signals is established in a magnetic circuit linking the core elements. This circuit includes the small space between the portions of the core elements forming the signal gaps. The circuit also extends between the back portions of the core elements. Inclination of the core elements in a transducer of the invention separates the back portions of the core elements, thereby increasing the magnetic reluctance of the portion of the magnetic circuit carrying the unwanted flux therebetween. The increased reluctance prevents the establishment of more than a negligible amount of unwanted magnetic flux. The absence of the unwanted flux prevents cross-talk signals from being induced into the signal translating coils.

Another cause of cross-talk has been found to be the magnetic coupling between the signal translating coils. The coils act as a transformer for cross-talk signals. The disposition of these coils on the inclined portions of the core elements in a transducer of this invention reduces the magnetic coupling between the coils, and, consequently, the cross-talk.

It is an object of the present invention to provide an improved magnetic record transducer.

It is a further object of the present invention to provide a magnetic record transducer which is adapted to cooperate with a magnetic record member having a plurality of closely spaced record tracks thereon.

It is a still further object of the present invention to provide an improved magnetic record transducer for use with multi-track magnetic records wherein cross-talk is substantially eliminated.

It is a still further object of the present invention to provide an improved multi-track magnetic record transducer wherein accurate positional relationship among the core elements is preserved.

These and other objects and advantages of the present invention will, of course, become apparent and immediately suggest themselves to those skilled in the art to which the invention is directed from a reading of the following description in connection with the accompanying drawings in which.

Figure 1:
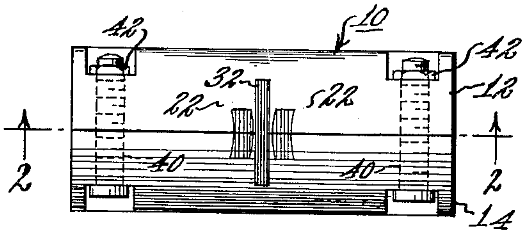
FIG. 1 is a plan view of a magnetic record transducer in accordance with the present invention drawn to an enlarged scale.
Figure 2:
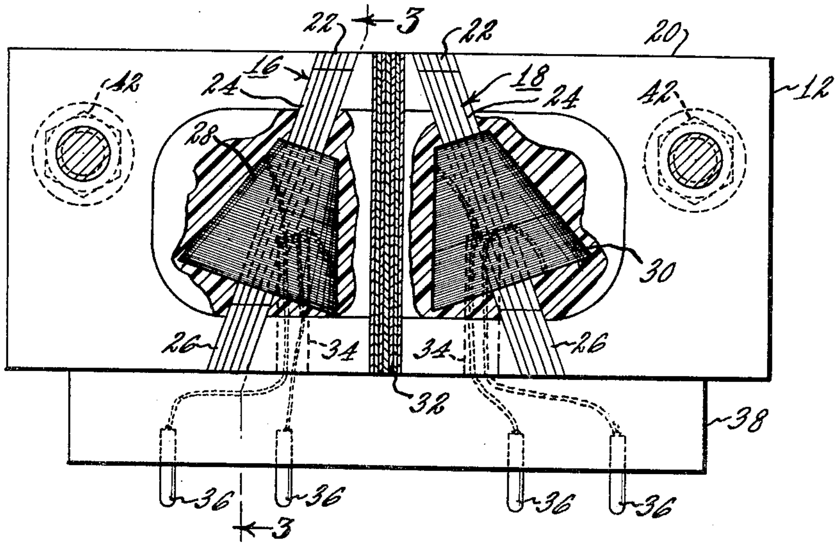
FIG. 2 is a sectional view, in elevation, of the magnetic record transducer illustrated in FIG. 1, the section being taken along the lines 2—2 of FIG. 1 when viewed in the direction of the arrows.
Figure 3:
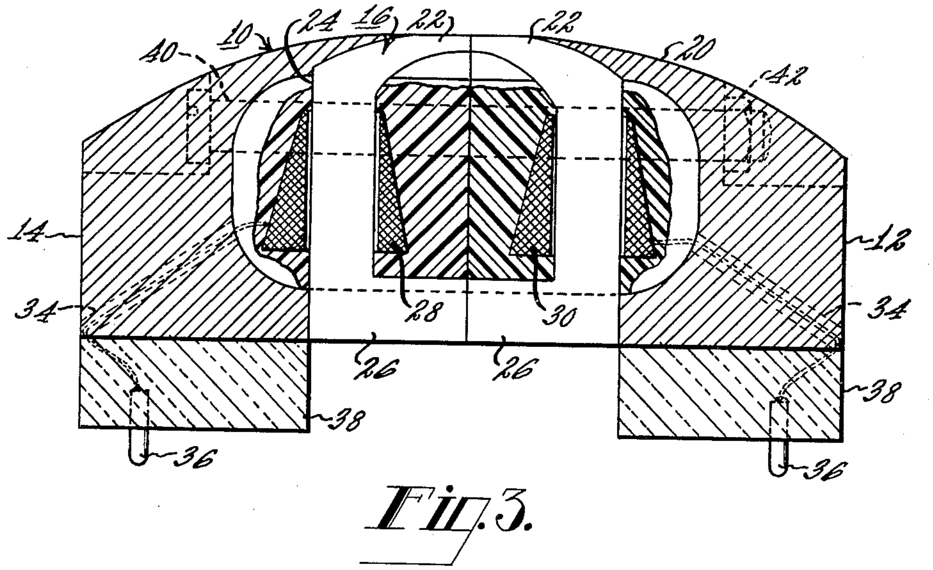
FIG. 3 is a sectional view of the magnetic record transducer of FIG. 1, the section being taken along the lines of 3—3 of FIG. 2 when viewed in the direction of the arrows.

A magnetic record transducer built in accordance with the invention may be observed with reference to FIGS. 1, 2 and 3 of the drawing. This transducer is capable of cooperating with a magnetic tape record member having two magnetic record tracks recorded thereon, and is especially suitable for applications wherein the tracks are in close proximity to each other. For example, the distance between the tracks may be a few hundredths of an inch and the tracks would also be a few hundredths of an inch in width. It will therefore be appreciated that the scale of the drawings illustrating the magnetic record transducer has been enlarged for purposes of clarity of illustration. A magnetic record transducer, constructed in accordance with the invention, can be of a size many times smaller than the illustrated size of the transducer as it appears in the accompanying drawing.

The component parts of the transducer are mounted in a housing 10 of non-magnetic material, such as aluminum. The housing 10 is constructed in two sections for greater manufacturing ease. The upper surface 20 of the housing 10 is rounded and polished so as to be adapted to engage the magnetic record tape. The faces of the housing sections 12 and 14, that are abutting when the transducer is assembled, are also accurately formed so as to uniformly contact each other. Each housing section 12 and 14 is provided with an arrangement of slots and recesses for receiving the other component parts of the transducer.

The transducer includes a pair of core elements 16 and 18. The core elements 16 and 18 are divided into substantially conjugate parts. Two of these parts are located in each of the sections 12 and 14 of the housing 10. Laminations of high permeability magnetic material are used to construct the core elements 16 and 18. These laminations may be stacked and cut to provide an element of approximate size. The pole portions 22 of the core elements are exposed from the housing and are arranged in side-by-side relationship at the surface of the housing that engages the record member. The width and space relationship of the pole portions 22 corresponds to the width and space relationship of the magnetic record tracks to be recorded and reproduced. It may be desirable to stack the laminations in positions staggered with respect to each other such that the end faces of the pole portions will be at constant depth as measured from the faces of the pole portions that are exposed to the tape.

Each of the core elements 16 and 18 includes a pair of leg members 24 which extend perpendicularly from the pole portions 22. Back portions 26 of each of the core elements 16 and 18 extend perpendicularly from the leg members 24 in the same direction as the pole portions 22 and are disposed at the end of the core elements 16 and 18 opposite from the pole portions 22. The leg members 24 and the back portions 26 may be considered as the body portions of the core elements 16 and 18. The faces of the pole portions 22 are accurately machined, lapped and polished together with the housing sections 12 and 14. The end faces of the pole portions are carefully constructed so that they will be level, since they define the signal gaps of the transducer. The ends of the back portions 26 are machined and have surfaces that make good magnetic contact with each other when the transducer is assembled.

The arrangement of the core sections 12 and 14 in the slots in the housing 10 insures that the desired positional relationship is preserved. This is especially important in the event that the magnetic record transducer is used in systems for sterophonic recording and reproduction since the accurate positional relationship of the signal translating elements in the transducer insures that the stereophonic signals will be recorded and reproduced without incurring unwanted phase displacements therebetween.

It will be observed that the core elements 16 and 18 are disposed at an inclination with respect to each other. This inclination is maintained by means of the slots arranged in the sections 12 and 14 of the housing 10. By virtue of the predetermined angular displacement provided between the core elements 16 and 18, their respective back portions 26 are separated by a predetermined distance. This insures that the magnetic coupling between the core elements is reduced to a minimum. The displacement of the core elements 16 and 18 also provides sufficient room for signal translating coils 28 and 30 which are wound around the leg members 24 of the core elements 16 and 18. The axes of the signal translating coils 28 and 30 which are each wound on different core elements 16 and 18, respectively, are also inclined with respect to each other.

A shield 32 is interposed between the core elements 16 and 18. Space is provided for this shield 32 because of the inclination of the core elements 16 and 18. The magnetic shield 32 is constructed from a plurality of stacked laminations of high permeability magnetic material and conductive non-magnetic material. The conductive non-magnetic material may be copper. The laminations of magnetic material are disposed centrally of the shield 32 and the laminations of copper are disposed at the outer portions of the shield 32. The magnetic laminations provide for increased magnetic shielding and decreased magnetic coupling between the coils 28 and 30, and the core elements 16 and 18. The shielding due to the laminations of conductive material prevents the leakage of high frequency signals, such as high frequency bias signals used in recording, between the core elements 16 and 18 and the signal translating coils 28 and 30. This shield 32 is illustrated in the drawing as a group of laminations, each of which is a single piece that extends between both sections 12 and 14 of the housing 10. However, a bi-part shieul similar to the shield 32 may be used. Each part of the shield will be located in a different one of the sections 12 and 14 of the housing. The ends of the shield will be in contact when the sections 12 and 14 of the housing 10 are assembled. It is desirable that the shield 32 be wider than the core elements 16 and 18 so that the shield will extend beyond the outer edges of the leg members 24.

It was pointed out heretofore that the coupling between the core elements 16 and 18 is due to a magnetic circuit which links these core elements. This magnetic circuit extends between the pole portions 22 of the core elements, and also between the back portions 26 thereof. Due to the close spacing of the pole portions, dictated by the size and spacing of the magnetic record tracks, it is difficult to limit the magnetic coupling between the core elements in the region of the pole portions 22. The inclination by a predetermined angle of the leg members 24 of the core elements 16 and 18 and the consequent separation of the back portions 26 by a predetermined distance results in a considerable increase in the magnetic reluctance in that portion of the magnetic circuit extending between the back portions 26 of the core elements 16 and 18. This increased reluctance is provided because of the non-magnetic gap that is as long as the distance between the back portions 26 of the core elements 16 and 18. Due to the large reluctance in this magnetic circuit, only a negligible amount of magnetic flux carrying cross-talk signals can link both of the core elements 16 and 18 and induce cross-talk signals into the signal translating coils 28 and 30. A major problem in miniature multi-track magnetic record transducers is cross-talk between the core elements of the transducer. This problem is solved in a transducer incorporating the present invention.

Another cause of cross-talk resides in the transformer coupling between the signal translating coils of the different core elements. Such coupling is dependent upon the angle of inclination of the axes of the coils with respect to each other, and is a maximum when the coil axes are parallel. The invention minimizes the transformer coupling by orienting the axes of the signal translating coils 28 and 30 of the different core elements 16 and 18 at a predetermined inclination with respect to each other. Thus, cross-talk is still further minimized in a transducer built in accordance with the invention.

The magnetic shield 32, which is interposed between the core elements, is also of assistance in reducing the cross-talk by magnetically and electrically shielding the core elements 16 and 18, and the coils 28 and 30 from each other.

The signal translating coils are illustrated in the drawing as being wound in the shape of a cone. Such winding shape may be found to provide a greater number of turns in a small area, such as provided by the recesses in the housing section 12 and 14. Any other shape of winding providing a required number of turns will be found suitable. The ends of the windings are brought through passageways 34 drilled in the transducer housing 10. These winding ends may be brought to terminals 36 located in a terminal block 38 of non-conductive material cemented to the bottom of the transducer housing. Before assembling the sections of the transducer by fastening together the sections 12 and 14 of the housing 10, it will be found desirable to fill the recesses in the housing with a casting resin. When the resin hardens the signal coils 28 and the legs 24 of the core elements 16 and 18 will be rigidly located in the positions defined in the housing 10.

Before assembling the transducer it may be desirable to insert a gap spacer between the ends of the pole portions 22 so that the width of the signal gap, defined by these ends of the pole portions 22, will be accurately determined. A very thin sheet of insulating material, such as mica, may be used as a gap spacer element. Alternatively, an insulating material, such as thorium oxyflouride, may be evaporated on the faces of the pole portions 22.

With the spacers inserted, the housing sections 12 and 14 are assembled in abutting relationship and fastened together by means of bolts 40 and nuts 42. The bolts extend through holes drilled in both sections 12 and 14 of the housing. These holes are aligned with respect to the slots in the housing 10 holding the core elements. Consequently, the conjugate parts of the core elements will be in alignment with their end faces opposed, when the housing sections 12 and 14 are assembled. Sufficient pressure is provided by tightening the bolts and nuts 40 and 42 to insure that the signal gap is of proper dimensions.

Figure 4:
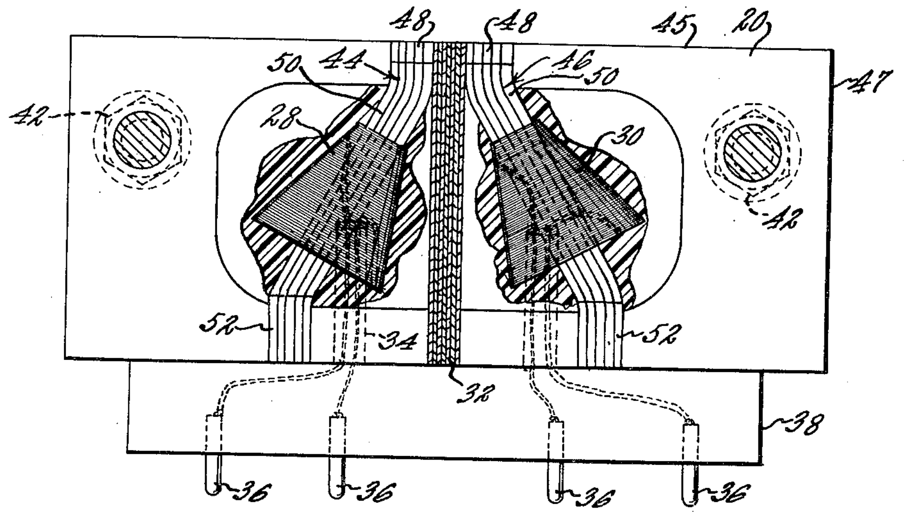
FIG. 4 is an enlarged view, partly in elevation and partly in section of a magnetic record transducer constructed in accordance with another embodiment of the invention, the section being taken along the line 4—4 of FIG. 5, when viewed in the direction of the appended arrows.
Figure 5:
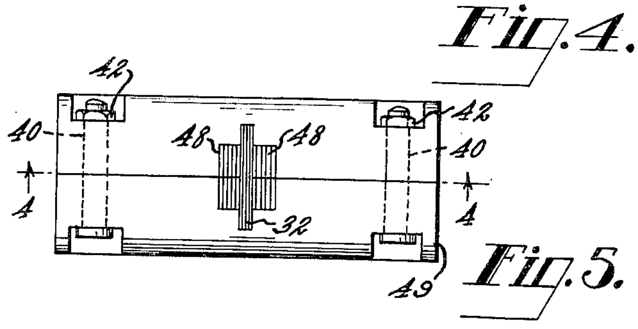
FIG. 5 is a plan view of the transducer of FIG. 4.

Referring now to FIGS. 4 and 5 there is shown a sectional view of another embodiment of a magnetic record transducer incorporating the present invention. The component parts of this transducer, which are similar to the parts of the transducer illustrated in connection with FIGS. 1, 2 and 3, are designated with like reference numerals.

The core elements 44 and 46 and the housing 45 of the transducer illustrated in FIG. 4 are modified to provide for convenience of construction and assembly. These core elements 44 and 46 include pole portions 48, leg members 50, and back portions 52. The slots in the sections 47 and 49 of the housing 10 for receiving the core elements 44 and 46 are perpendicular to the base surface of the housing and to the surface of the housing that engages the record tape. A single rabbeted slot is provided for receiving the pole portions 48 of the core elements and the top of a shield 32 separating the core elements. It will be noted that the corresponding slots in the housing sections 12 and 14 of the transducer illustrated in connection with FIGS. 2 and 3 are inclined with respect to the record engaging surface 20 of the transducer housing 10 and that these slots are provided in the upper portion of the housing 10 for receiving the pole portions of the cores 16 and 18 and the shield 32. A difficult step in the construction of the housing in providing properly angularly oriented slots is thereby eliminated. The laminations of the core elements 44 and 46 in the pole portions 48, thereof, and in the back portions 52, thereof, are perpendicular to the record engaging surface 20 and the back surface of the housing 10. It has been found to be more convenient to provide the perpendicularly oriented arrangement, since the laminations need not be staggered to provide pole end faces of uniform depth along the width of the pole portions 48.

The shield 32 is wider than the core elements 44 and 46 and extends beyond the core elements into the groove of the rabbeted slots in the housing sections 47 and 49. The adjacent sides of the pole portions 48 of the core elements 44 and 46 bear against the opposite sides of the shield 32. The thickness of the shield 32 determines the separation of the pole portions 48 and, consequently, the separation of the record tracks. As mentioned heretofore, the outer laminations of the shield 32 are desirably of copper or some other conductive, non-magnetic material.

The core elements 44 and 46 are bent at two points. One of these points is slightly in back of the pole portions 48 and the other of these points is approximately at the junction of the leg members 50 with the back portions 52. It will be observed that the inclined relationship of the leg members 50 of the core elements 44 and 46 is preserved. The signal translating coils 28 and 30 are wound around the leg members 50 and are therefore inclined with respect to each other. Consequently, the core elements 44 and 46 are magnetically decoupled from each other by virtue of the inclination and separation of the core elements 44 and 46. The transformer coupling between the signal translating coils 28 and 30 is also minimized because the axes thereof are inclined with respect to each other, as explained heretofore. The transducer illustrated in FIGS. 4 and 5 is assembled and used in the same manner as the transducer illustrated in FIGS. 1, 2 and 3.

There has been described an improved magnetic record transducer for multi-track magnetic records adapted to be constructed of miniature size wherein cross-talk between a plurality of head elements is substantially eliminated.

What is claimed is:

1. A magnetic record transducer for cooperation with a multi-track magnetic record member comprising a first core element, a second core element, said core elements each including a polar portion defining a signal gap, leg members extending from said polar portions and a back member joining said leg members, said polar portions being disposed in side by side relationship with said signal gaps exposed to scan a pair of spaced record tracks on the cooperating magnetic record member, said leg members of said first and said second core elements being disposed at an inclination with respect to each other to provide for separation of said back portions by a predetermined distance for minimizing magnetic coupling between said core elements, and signal translating cores wound on at least one of the inclined leg members of each of said core elements.

2. A magnetic record transducer comprising a pair of core element structures of magnetic material each having two sections, each of said sections including a leg member, a pole portion and a back portion, means for supporting said two sections of each of said core element structures in pairs, said leg members of each of said core element section pairs being inclined with respect to each other so that said pole portions are more closely spaced than said back portions whereby said back portions are separated by a predetermined distance to minimize magnetic coupling and to reduce cross-talk between said core element structures, signal coils disposed on said inclined leg members of one of said supported core element section pairs, said pole portions and said leg portions of each of said core element section pairs extending in the same direction from said leg members thereof, the ends of said pole portions providing faces for defining signal gaps, the ends of said back portions providing faces for defining back gaps, and means for assembling said core element section pairs to provide said pair of core element structures with said faces of said pole portions opposing each other and defining said signal gaps and with said faces of said back portions in juxtaposition defining said back gaps.

3. A magnetic record transducer comprising a housing of non-magnetic material having an opening therein and a further opening communicating with said first named opening, a pair of core element structures of magnetic material disposed in said first named opening, each of said structures having pole portions which define signal gaps for said elements and a body portion, a magnetic shield of a predetermined thickness having parallel, opposite side surfaces disposed in said further opening and extending across said first named opening, adjacent sides of said pole portions bearing on different ones of said opposite side surfaces of said shield whereby said pole portions are separated by a distance equal to said predetermined thickness, said body portions of each of said structures being disposed at an angle to said pole portions thereof such that said body portions are inclined with respect to each other to minimize the magnetic coupling between said core elements.

4. A magnetic record transducer comprising a housing of non-magnetic material having a recess therein and a slot at the surface thereof communicating with said recess, a magnetic shield of predetermined thickness having a pair of parallel, opposite side surfaces, said shield being disposed in said slot and extending through said slot into said recess, a pair of core elements provided by structures of magnetic material having leg members, pole portions and back portions, said pole portions defining a signal gap for said core elements, said leg members being bent at an angle with respect to said pole portions to displace said back portions laterally from said pole portions, said structures being disposed in said recess of said housing on opposite sides of said shield with said pole portions extending into said slot, adjacent sides of said pole portions abutting different ones of said side surfaces of said shield to effectively separate said pole portions by a predetermined distance, and said leg members being inclined at an angle with respective said side surfaces of said shield so that said back portions are displaced from each other to minimize magnetic coupling between said core elements.

5. A magnetic record transducer according to claim 4 including signal translating coils wound around at least one of said leg members of each of said core elements, the axes of said coils being at an angle with respect to each other to minimize transformer coupling therebetween.

References Cited in the file of this patent

UNITED STATES PATENTS

| | | |
|---|---|---|
| 2,590,292 | Anderson | Mar. 25, 1952 |
| 2,615,989 | Thad | Oct. 28, 1952 |
| 2,700,073 | Kleis et al. | Jan. 18, 1955 |
| 2,756,280 | Rettinger | July 24, 1956 |
| 2,769,036 | Selstad | Oct. 30, 1956 |
| 2,923,779 | Namenyi-Katz | Feb. 2, 1960 |

FOREIGN PATENTS

| | | |
|---|---|---|
| 884,881 | France | May 10, 1943 |
| 820,506 | Germany | Nov. 12, 1951 |